(No Model.)
A. FISKE.
FILTER FOR WATER COOLERS.
No. 291,889. Patented Jan. 15, 1884.
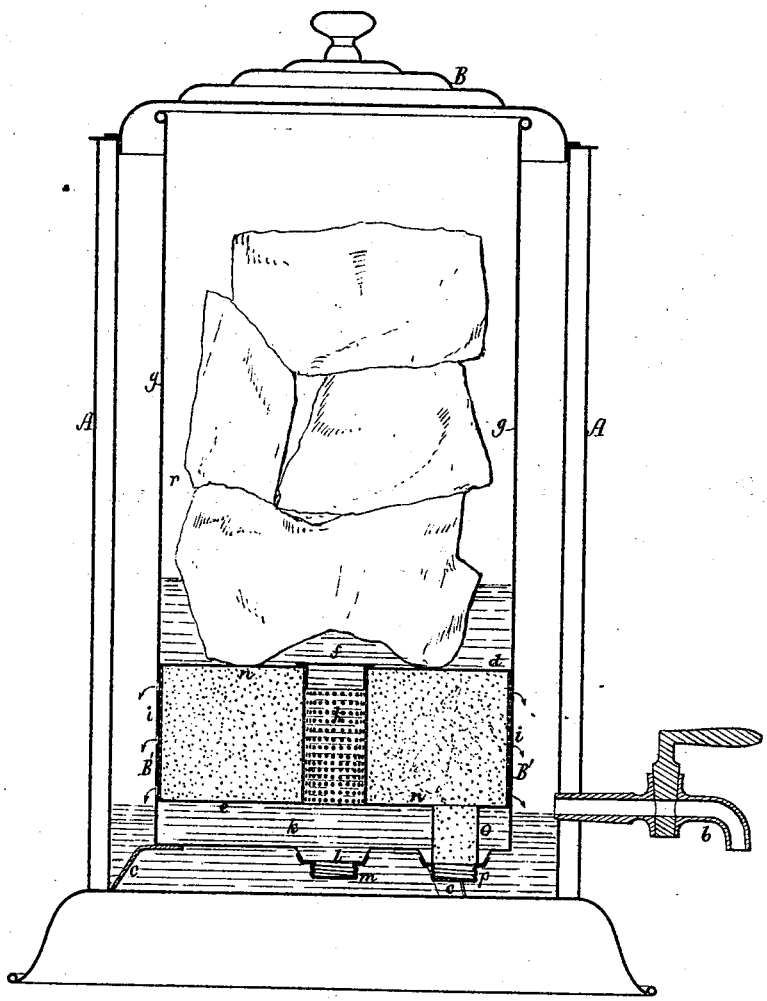
Witnesses
S. N. Piper
E. B. Pratt
Inventor
Allen Fiske
by R. H. Eddy, atty.

UNITED STATES PATENT OFFICE.

ALLEN FISKE, OF BOSTON, MASSACHUSETTS.

FILTER FOR WATER-COOLERS.

SPECIFICATION forming part of Letters Patent No. 291,889, dated January 15, 1884.

Application filed April 3, 1883. (No model.)

*To all whom it may concern:*

Be it known that I, ALLEN FISKE, of Boston, in the county of Suffolk, of the Commonwealth of Massachusetts, have invented a new and useful Improvement in Filters for Water-Coolers; and I do hereby declare the same to be described in the following specification, and represented in the accompanying drawing, which is a vertical and transverse section of a water-cooler with a filter of my improved construction, the nature of my invention being defined in the claims hereinafter presented.

In such drawing, A denotes a cylindrical tank open at top, and there provided with a removable cover, B. This tank may be made of sheet metal, or be of earthenware. At or near its bottom such tank has a faucet or cock, b, to discharge water from the tank as occasion may require.

There is arranged concentrically within the tank A, and supported on its bottom by feet c, the filter B', which consists of a tank, g, open at top, and somewhat above its bottom divided horizontally by two partitions, d e, arranged as represented. Between the said partitions and extending from one to the other of them is a foraminous tube, h, across whose upper end a foraminous cap, f, extends, the said tube h being concentric with the tank g. The space between the partitions d and e and around the tube h is an annular chamber to contain the filtering material—such as charcoal in a pulverized state, or charcoal and sand—the outer periphery, i, of such chamber being foraminous. The space or chamber k, beneath the partition e, is the sediment-receiver, it having at its bottom a discharging-neck, l, provided with a screw-cap, m, to close it. Furthermore, from the bottom of the filtering medium, receiving-chamber, or space a tube or induct, o, extends to and through the bottom of the filter B, and is there provided with a screw-cap, p. The space r, over the partition d of the tank g, is to contain water and ice, the water flowing from such space through the cap f into and filling the tube h and the chamber k. In being filtered, the water will flow through the filtering-medium of the chamber n and thence into the tank A, the intercepted sediment falling from the tube h into the chamber k. The water in the tank A will gradually rise to the level of the water in the filtering-tank, and may be drawn out of the tank A by the faucet or cock b, such water being kept cool by the ice in the chamber r of the filter.

I would remark that, instead of applying the foraminous cap f to the top of the tube h, it may be to the bottom of such tube; but it is preferable to have it at the top.

The induct o is to enable the chamber n to be supplied with the filtering material, and to have such removed from it as occasion may require.

The above-described filter is not of the class in which the water has a reverse flow, or is filtered and purified in passing upward through the filtering material, as described in the United States Patents Nos. 201,102 and 268,776. The filters represented in such patents differ very materially from mine and operate differently; for in my said filter not only is the tube h foraminous, but the periphery of the chamber that said tube extends through is foraminous, whereby the water in passing through the filtering medium does so horizontally and radially, and not upward or in a vertical direction, it being received into a vessel, A, surrounding the filter.

I claim—

1. The filter B, constructed substantially as described—viz., with its filtering-chamber foraminous in its periphery, and provided with a foraminous tube extending down through it, and opening at its lower end into a sediment-chamber and at its upper end into a chamber for the reception of ice and water, such filtering-chamber and ice-and-water chamber being within or surrounded by a tank, A, provided with a cock, b, as set forth.

2. The combination of the tank g, provided at its bottom with the educt l, with the filtering-chamber arranged in such tank and opening through the sides thereof, and having a filling-induct, o, opening through the bottom of the tank, as set forth, and also with the foraminous tube h, extending through such chamber from top to bottom thereof, and opening at top and bottom into the tank, all being substantially as set forth.

3. The combination of the tank A, provided with the discharge-cock $b$, with the water-and-ice-receiving chamber $r$, sediment-chamber $k$, and the filtering-chamber and its tube, foraminous in their peripheries, as described, all being arranged substantially as set forth, and the said sediment and filtering chamber being provided with the ducts $o$ and $l$, as explained.

ALLEN FISKE.

Witnesses:
R. H. EDDY,
E. B. PRATT.